(12) United States Patent
Brester et al.

(10) Patent No.: US 7,452,088 B2
(45) Date of Patent: Nov. 18, 2008

(54) MIRROR WITH ADJUSTABLE DETENT

(75) Inventors: Robert R. Brester, New Berlin, WI (US); Thomas L. Roberts, Mukwonago, WI (US)

(73) Assignee: Velvac, Incorporated, New Berlin, WI (US)

( * ) Notice: Subject to any disclaimer, the term of this patent is extended or adjusted under 35 U.S.C. 154(b) by 0 days.

(21) Appl. No.: 11/682,615

(22) Filed: Mar. 6, 2007

(65) Prior Publication Data

US 2007/0211356 A1 Sep. 13, 2007

Related U.S. Application Data

(60) Provisional application No. 60/779,874, filed on Mar. 7, 2006.

(51) Int. Cl.
  *G02B 5/08* (2006.01)
  *G02B 7/182* (2006.01)
  *B60R 1/06* (2006.01)

(52) U.S. Cl. .................. 359/841; 359/872; 248/478; 248/479

(58) Field of Classification Search .......... 359/841, 359/872, 877; 248/477, 478, 479, 483
See application file for complete search history.

(56) References Cited

U.S. PATENT DOCUMENTS

| | | | | |
|---|---|---|---|---|
| 3,339,876 A * | 9/1967 | Kampa | .................. | 248/478 |
| 4,186,905 A * | 2/1980 | Brudy | .................. | 248/478 |
| 4,466,594 A * | 8/1984 | Sharp | .................. | 248/484 |
| 4,606,619 A * | 8/1986 | Yamana | .................. | 248/549 |
| 4,623,115 A * | 11/1986 | Brester | .................. | 248/479 |
| 4,789,232 A * | 12/1988 | Urbanek | .................. | 248/549 |
| 5,081,546 A * | 1/1992 | Bottrill | .................. | 359/841 |
| 5,137,247 A * | 8/1992 | Lang et al. | .................. | 248/549 |
| 6,133,704 A * | 10/2000 | Yoshida et al. | .................. | 318/466 |
| 6,286,968 B1* | 9/2001 | Sailer et al. | .................. | 359/872 |
| 6,390,630 B1* | 5/2002 | Ochs | .................. | 359/841 |
| 7,008,067 B2* | 3/2006 | Hsu | .................. | 359/841 |

\* cited by examiner

*Primary Examiner*—Ricky D Shafer
(74) *Attorney, Agent, or Firm*—Schiff Hardin LLP

(57) ABSTRACT

A mirror unit for a vehicle includes a base from which extends an arm holding a mirror housing. The arm is pivotably mounted in the base to permit the mirror to be pivoted toward the vehicle in the event that the mirror is struck, for example. The extended position of the mirror when not folded is defined by a detent in the pivoting movement. The detent position of the mirror is the result of a bolt that presses a spring. The spring in turn presses a hub on the arm against an indexing pivot post, so that ramps on the hub bear against ramps on the indexing pivot post and define the detent position of the mirror. The indexing pivot post has an arrangement of teeth that engage into tooth recesses on the base when pressed thereagainst by the spring. The detent position of the mirror can be changed by the user by the user releasing the bolt to relieve spring pressure on the teeth so that the teeth of the indexing pivot post disengage from the tooth recesses and can be pivoted to a new detent position. The new detent position is ensured by tightening the bolt so that the spring presses the teeth into the tooth recesses.

11 Claims, 5 Drawing Sheets

MIRROR WITH ADJUSTABLE DETENT

CROSS REFERENCE TO RELATED APPLICATION

This application claims the benefit of U.S. Provisional Patent Application No. 60/779,874, filed Mar. 7, 2006, which is incorporated herein by reference.

BACKGROUND OF THE INVENTION

1. Field of the Invention

The present invention relates generally to an external mirror for a motor vehicle and in particular to a mirror mounting and housing permitting pivoting movement of the mirror housing.

2. Description of the Related Art

Motor vehicles, such as trucks, have externally mounted mirrors extending from one or both sides of the vehicle by which the driver can see behind the vehicle. Such mirrors are provided on the vehicle when purchased new and they are also sold as after-market items for replacement of the original mirror mounts. Since the mirrors extend from the vehicle, they are subject to being struck or sticking objects that pass close to the sides of the vehicle. As such, it has become common to provide mirror mounts that fold the mirror head toward the vehicle when struck.

The mirrors and mirror mounts are sized for the configuration of the vehicle when sold and when driven by the average driver. When the vehicle is used to tow a trailer, for example, or when a truck has a truck body added onto the frame or a camper body mounted on the truck, the original mirrors are likely to be inadequate to provide a full view to the driver. Add-on mirrors or replacement mirrors are commonly used in such situations. Drivers who desire additional visibility may also change mirrors on their vehicles.

The assignee of this application developed and sold a family of extended rearview mirrors that could replace the standard OEM mirrors on most domestic vans and pickup trucks. This original family of automotive styled mirrors was designated as the 2015 series and was designed to fit on the door as a direct replacement for the OEM mirror allowing our customers to easily retrofit this mirror to the vehicle for wide body applications. These wide body applications use a standard full-sized cutaway Ford, GM or Chrysler van or pickup chassis that is later outfitted with a utility box or camper body.

The original 2015 mirror had a friction pivot system that would allow the long arm to rotate rearwards if the mirror struck an object or if the mirror needed to be folded away in a tight parking situation. The design only allowed the mirror to rotate to the rear of the vehicle and not forward.

An upgrade to this mirror was an improved pivot system that consisted of a spring loaded joint applying pressure to a set of ramps that provided the pivot with a sort of "snap action" as it was rotated. The 2020 name was given to this new and improved series of mirrors. Other improvements allowed the mirror to pivot both forward and rearward and the ramps were oriented so when the mirror was approximately 90 degrees perpendicular to the body of the vehicle, the arm would drop into a locked or "home position". This pivot home position places the mirror head in the proper set position for viewing from the driver's seat allowing for a "no tools" adjustment. This pivot home position is set and can not be changed by the end-user.

SUMMARY THE INVENTION

The present invention provides a mirror housing and mounting for a motor vehicle which not only pivots to fold the mirror housing toward the vehicle but also permits an adjustment of the home position of the mirror housing by the end-user.

In one embodiment, the mirror housing is mounted on an arm that has a pivot end at the end of the arm opposite the mirror housing. The pivot end of the arm is held in a bracket portion of a base. A hub in the pivot end of the arm has ramps that interact with ramps on a pivot post to provide the pivoting and detent function. The pivot post has an indexing surface that in one embodiment has teeth that engage into tooth recesses. The teeth are kept engaged in the tooth recesses during normal operation, but when selectively released by a user the teeth disengage from the recesses and permit movement of the detent or home position of the mirror unit. Advantages according to various embodiments are as follows.

DETAILED DESCRIPTION OF THE PREFERRED EMBODIMENTS

Figure 1:
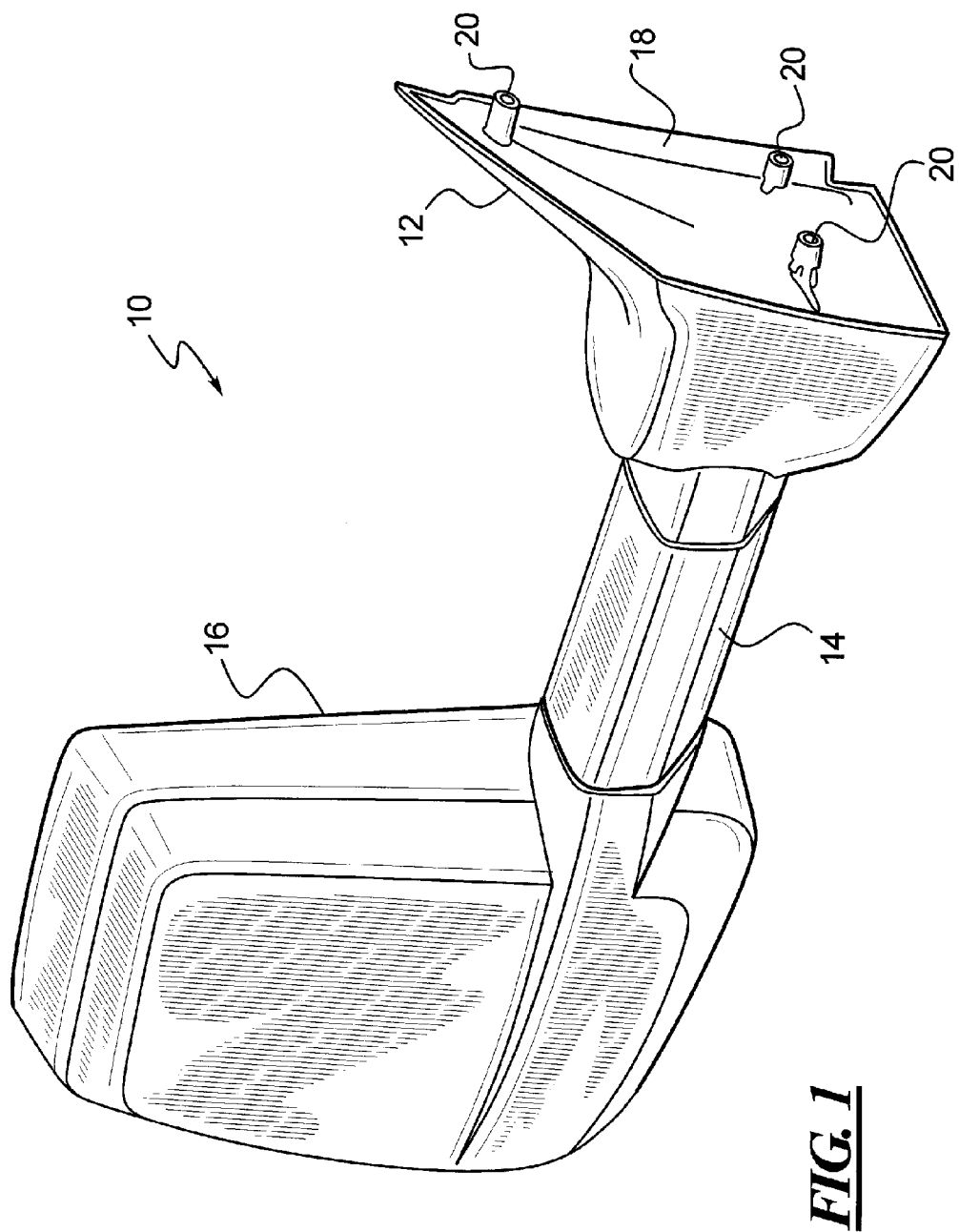
FIG. 1 is a perspective view of the mirror unit according to the principles of the present invention.

Referring first to FIG. 1, a mirror unit 10 for a motor vehicle includes a mounting base 12 by which the mirror unit 10 is mounted onto a vehicle. The base 12 supports an arm 14 that extends from the base to hold the mirror away from the vehicle when the mirror unit 10 is mounted to a vehicle. The arm 14 is connected to a mirror housing 16 that holds one or more mirrors. The mirror(s) in the mirror housing 16 may be flat to provide an undistorted view or may be convex to provide a wide angle view to the driver.

The mounting base 12 includes a mounting surface 18 that is affixed to the vehicle. Preferably, the mounting surface 18 is configured to replace the original mirror unit of the vehicle. Mounting screws 20 are shown on the mounting surface by which the mirror unit is affixed to the vehicle.

The mounting base 12, arm 14 and mirror housing 16 may be in any of a variety of configurations, shapes and proportions, all of which are within the scope of this invention.

Figure 2:
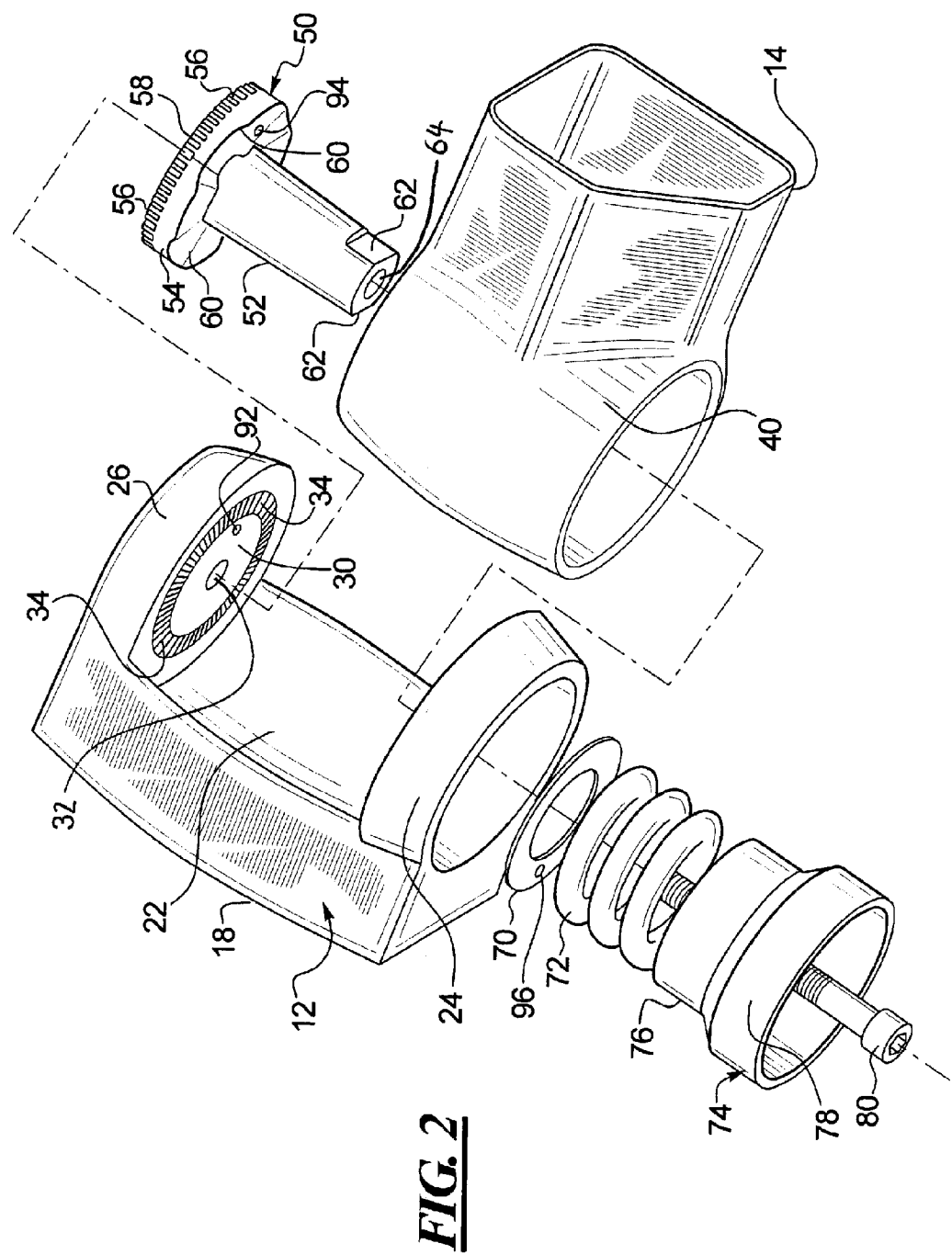
FIG. 2 is an exploded view in perspective of a pivot portion of the mirror unit of FIG. 1.

In FIG. 2, the mounting base 12 has a bracket portion including a cylindrical space 22 at the ends of which is a ring shaped support 24 and a cap portion 26, respectively. The mounting surface 18 is on the opposite side of the bracket portion from the cylindrical space 22. The cylindrical space 22 is open to the sides to permit pivoting movement of the arm 14 relative to the base 12. In the preferred embodiment, the cylindrical space 22 is open to permit the arm to pivot both rearward as well as forward relative to the vehicle.

The cap portion 26 has an indexing surface 30 facing the cylindrical space 22. The indexing surface 30 includes a threaded bore 32 that is axially aligned relative to the cylindrical space 22. A ring of tooth recesses 34 is formed in the indexing surface 30 of the cap portion 26. The tooth recesses 34 are generally at a constant radius from the threaded bore 32 and are preferably arranged at a regular spacing from one another. In one embodiment includes tooth recesses 34 at approximately six degree intervals around the circumference of the ring, in other words, about 60 equally spaced tooth recesses. Other spacings are of course encompassed within the scope of this invention. It is envisioned that the tooth recesses may not be arranged in a continuous ring but that they may be disposed in only a partial ring or arc about the threaded bore 32, or several partial rings. More than one centric ring or partial ring is also envisioned.

The arm 14 has a cylindrically shaped end 40 that is slightly smaller than the cylindrical space 22 in the bracket portion of the base 12. The cylindrically shaped end 40 fits into the cylindrical space 22 and permits pivoting movement of the arm 14 relative to the base 12. The cylindrically shaped end 40 is hollow except for hub portion in the hollow interior, which may be near one axial end of the cylindrical hollow interior of the end 40. The hub portion has a central opening, a ramp or cam shaped surface on one side surrounding the central opening facing toward the indexing surface 30 of the cap portion 26, and a smooth surface on the opposite surface of the hub. The hub of one embodiment is a disc shaped plate within the hollow interior, although other shapes are possible as well.

An indexing pivot post 50 is provided in the hollow interior of the cylindrically shaped end 40 of the arm 14. The indexing pivot post 50 has a post portion 52 that fits through the central opening of the hub. A disc shaped pivot and indexing portion 54 is provided on the end of the post portion. The disc shaped portion 54 has teeth 56 at an indexing surface 58. The teeth 56 are arranged in a ring that corresponds to the ring of tooth recesses 34 in the indexing surface of the cap portion 26. The teeth 56 fit into the tooth recesses 34 of the cap portion 26 in an engagement that resists rotation of the pivot post 50 relative to the base 12 while the teeth are engaged.

The opposite surface of the disc shaped pivot and indexing portion 54 is provided with ramps 60. The ramps 60 have raised portions (raised in the axial direction of the pivot post 50) and angled surfaces leading to the raised portions from both sides, relative to the rotation about an axis of the pivot post 50. The ramps 60 preferably match with and fit into cooperative engagement with the ramp or cam surface of the hub in the hollow interior of the arm end 40.

The post portion 52 of the indexing pivot post 50 has two flats 62 at the free end which are used to inhibit unintended rotation. A bore 64 extends through the indexing pivot post 50 in an axial direction.

It is foreseen that the indexing pivot post may be formed in two or more pieces or may eliminate the post portion altogether. For example, the disc shaped portion with the indexing surface on one side and the detent ramps on the other side may be a separate part unto itself. The post portion prevents rotation of the spring holding disc. However, it may be possible to engage the spring holding disc with the bracket, for example, and thereby prevent rotation of the spring holding disk without requiring the post portion. Other configurations are of course possible.

A slip disc 70 is provided in the hollow interior of the cylindrically shaped end 40 of the arm 14 and is positioned to bear against the smooth surface of the hub. The slip disc 70 is pressed against this surface by a preset spring 72. The preset spring 72 is preferably a coil spring of spring steel. The opposite end of the spring 72 is held by a pivot support disc 74.

The pivot support disc 74 has includes a cylindrical portion 76 of a first exterior diameter so as to fit into the hollow of the end 40 of the arm 14. The end of the spring 72 opposite the slip disc 70 fits onto the pivot support disk 74 where it is supported on a disc shaped surface provided with a central hole. The pivot support disk 74 has a second portion 78 of a second exterior diameter that fits into snug engagement in the ring shaped support 24 of the base 12. The disc shaped portion has the central hole with a recess of a diameter to accommodate the end of the post and includes flats to engage the flats 62 of the pivot post. A smaller diameter central hole continues through the disc shaped portion of the pivot support disc 74.

An elongated threaded bolt 80 fits into the central hole of the pivot support disc 74, through the bore 64 in the indexing pivot post 50 and threads into the threaded bore 32 in the end cap 26 of the base 12. The bolt 80 of a preferred embodiment is a shoulder bolt and in one embodiment is a 3⁄8 inch Allen bolt.

The threaded bolt 80 and the spring 72 are of steel, while in the preferred embodiment the base 12, arm 14, indexing pivot post 50 and pivot support disc 74 are of an aluminum alloy that is preferably die cast into the desire shapes. The slip disc 70 is of a low friction material A cover of injection molded plastic serves as the outside surface of the mirror unit. The plastic covering provides durability, weather resistance and the a color or surface texture as desired by the user.

Figure 3:
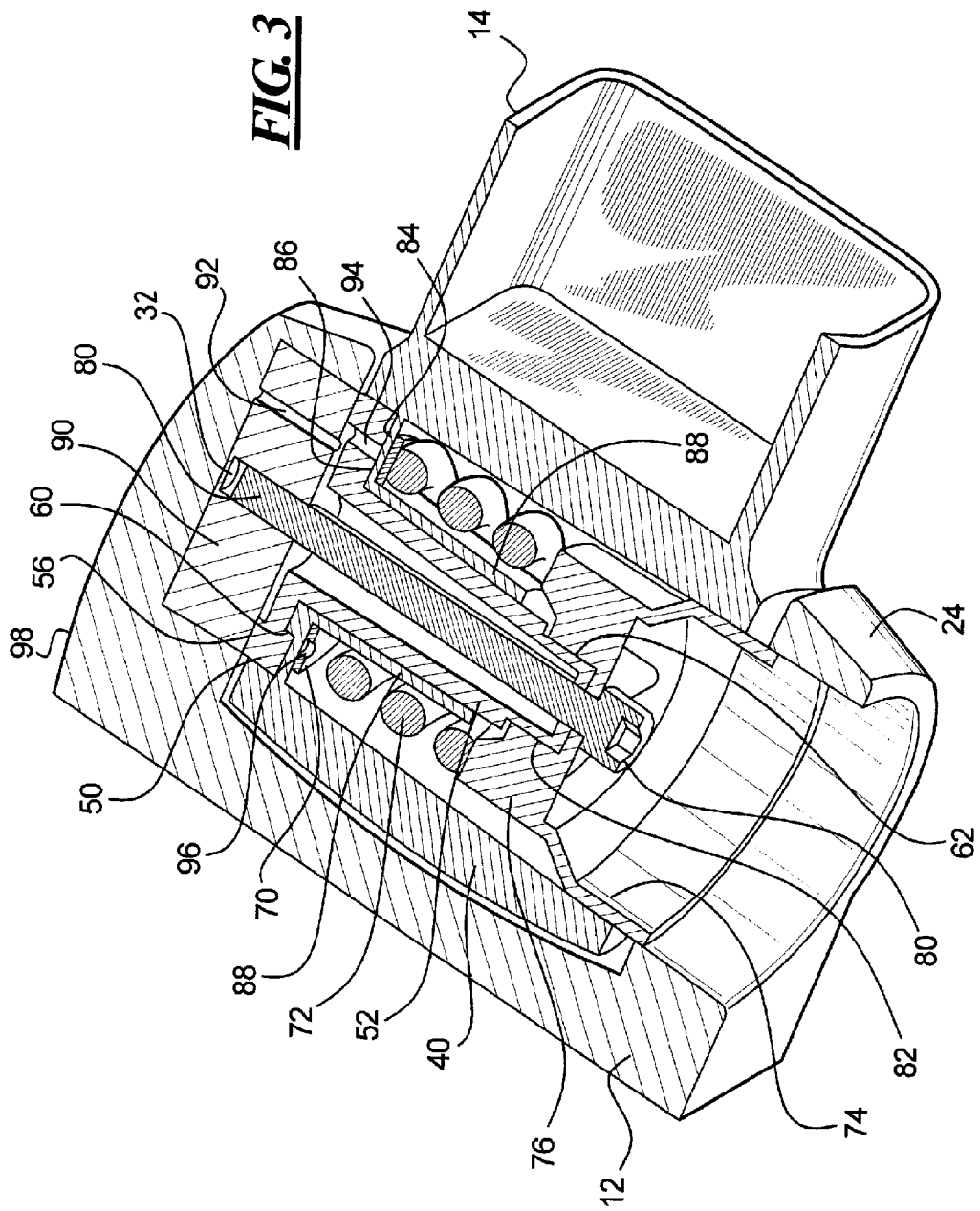
FIG. 3 is a cross section of the pivot portion of FIG. 2 of the mirror unit.

Turning now to FIG. 3, the threaded bolt 80 is shown extending from the upon bottom of the mirror unit 10, through the pivot support disc 74, through the end of the post portion 52 of the indexing pivot post 50, through the hollow center of the post portion 52 and into the threaded bore 32 in the end cap 26. The pivot support disc 74 has the end of the post portion 52 fit into a corresponding opening 82 in the pivot support disc 74. The opening 82 has two flats just like the end of the post 52. The flats 62 on the post 52 and the flats in the opening 82 prevent rotation between these two parts. Any rotation in the system occurs at the slip disc 70.

The teeth 56 of the indexing pivot post 50 are shaped to engage into the tooth recesses 34 of the cap portion 26 and prevent these two parts from rotating relative to one another when the spring 72 is pressing these parts together. The teeth 56 and/or the tooth recesses 34 may be shaped with a taper to enable the teeth 56 to readily fit into the recesses 34 during adjustment of the detent position. However, the teeth and recess engagement should be secure enough so as not to permit rotation of the indexing pivot post 50 when the spring force is applied. Otherwise, an inadvertent shifting of the detent position will occur.

The hub, indicated in FIG. 3 as element 84, inside the end 40 of the arm 14 is shown. The hub 84 generally is a disc shaped portion 86 formed inside the hollow end 40, the disc shaped portion 86 including one or more ramp surfaces that engages the ramps 60 on the indexing pivot post 60. The ramps of the disc portion 86 interacting with the ramps 60 of the indexing pivot post 50 under the force of the spring 72 and not only define the detent but also permit pivoting of the mirror to the folded positions.

The hub 84 also includes a sleeve portion 88 into which the post portion 52 of the indexing pivot post 50 fits. The spring 72 fits around the sleeve 88 of the hub 84.

An insert 90 is provided in the end cap 26. An opening 92 is provided in the insert 90 and an opening 94 is in the indexing pivot post 50. An opening 96 is also provided in the slip ring 70. The covering 98 of the mirror unit 10 is seen in FIG. 3 as well.

The position of the ramps 60 on the indexing pivot post 50 relative to the ramps on the hub 84 of the arm 14 defines the home position of the mirror unit 10 relative to the vehicle body. The mirror unit 10 may be pivoted either forward or rearward by applying a force to the mirror unit 10 sufficient to overcome the spring force of the spring 72 and permit the ramps on the hub 84 of the arm 14 to slide on the ramps 60 of the indexing pivot post 50. After being moved to the pivoted position, the arm 14 of the mirror unit 10 is returned to the home position, where the spring force of the spring 72 forces the ramps 60 to an engaged home position to resist ready folding movement of the arm 14. This provides the detent or home position of the mirror.

The end 78 of the pivot support disc 74 is in the ring portion 24 and provides the support for the pivoting movement of the mirror in the base 12 at the end of the pivot opposite the cap 26. The post portion 52 of the indexing pivot post 50 provides pivoting support for the pivoting of the mirror as well.

The pivoting movement of the arm 14 in the base 12 requires that the spacing of the ring portion 24 from the end cap 26 be greater than the axial length of the end 40 of the arm 14, preferably by at least the height of the ramps. This is because the arm 14 shifts axially relative to the threaded screw 80 during movement from the home position to the pivot position, and vise versa.

The force of the spring 72 on the hub 84 of the arm 14 which in turn applies the force to the indexing pivot post 50 keeps the teeth 56 engaged in the tooth recesses 34 of the end cap. This maintains the home position of the mirror arm 14 in a fixed position.

The home position or detent position of the mirror arm 14 can be changed in increments (for example in six degrees increments or any other configurable increment) by loosening the bolt 80. In one embodiment, approximately one inch of the threaded bolt 80 is threaded into the threaded bore 32 in the end cap 26. Loosening the pivot bolt 80 will result in relaxing the pressure on the spring 72 and backing the spring away from the slip disc 70. Without the spring 72 pressing on the slip disc 70, the teeth 56 of the pivot post 50 can disengage from the tooth recesses 34 in the end cap 26. The mirror arm 14 can then be pivoted about the bolt 80, which is still engaged in the threaded bore 32, to a new home position by the user. In this condition, the arm 14 can be rotated freely in either direction and a new home position can be provided. The home position is changed for example to provide better visibility for the driver who is taller, shorter, who's truck is larger or smaller, or who otherwise wishes a different view to the rear of the vehicle.

By tightening the threaded bolt 80, pressure is again applied by the pivot support disc 74 on the spring 72, causing the spring 72 to press the hub of the arm 14 against the indexing pivot post and causing engagement between of the teeth 56 of the indexing pivot post into the tooth recesses 34. This results in the arm 14 being indexed relative to the base 12 to a new home or detent position. The engagement of the teeth secures the detent position in the new position. The mirror unit 10 can then be pivoted to a folded position and returned to the new home position.

It should be noted that frictional fit or other interference fit or other shaped engagement surface arrangements are envisioned in place of the teeth 56 and tooth recesses 34. The teeth may be made wider or narrower, may be staggered at different radiuses or otherwise vary from the illustrated preferred embodiment without departure from the principles of the present invention.

Similar to the above-described system, the spring loaded joint applies pressure to a set of ramps 60 that provided the pivot with a sort of "snap action" as it is rotated. The ramps 60 interface with a ramp interface on the hub of the arm 14. The ramps 60 comprise a flattened portion that biases the hub to have a preferred location. The ramps 60 interface with the hub at ramp interface portions. Thus, the mirror is allowed to pivot both forward and rearward and the ramps 60 can be oriented so when the mirror is in a user-adjusted angular relationship to the body of the vehicle, the arm 14 drops into the locked or "home position". This pivot home position is therefore adjustable and can changed by the end-user.

This adjustable home position is highly desirable since it allows the end-user to fine adjust the position mirror head for optimum viewing. Personal preference and varying height drivers require different seating adjustments making this feature desirable.

Figure 4:
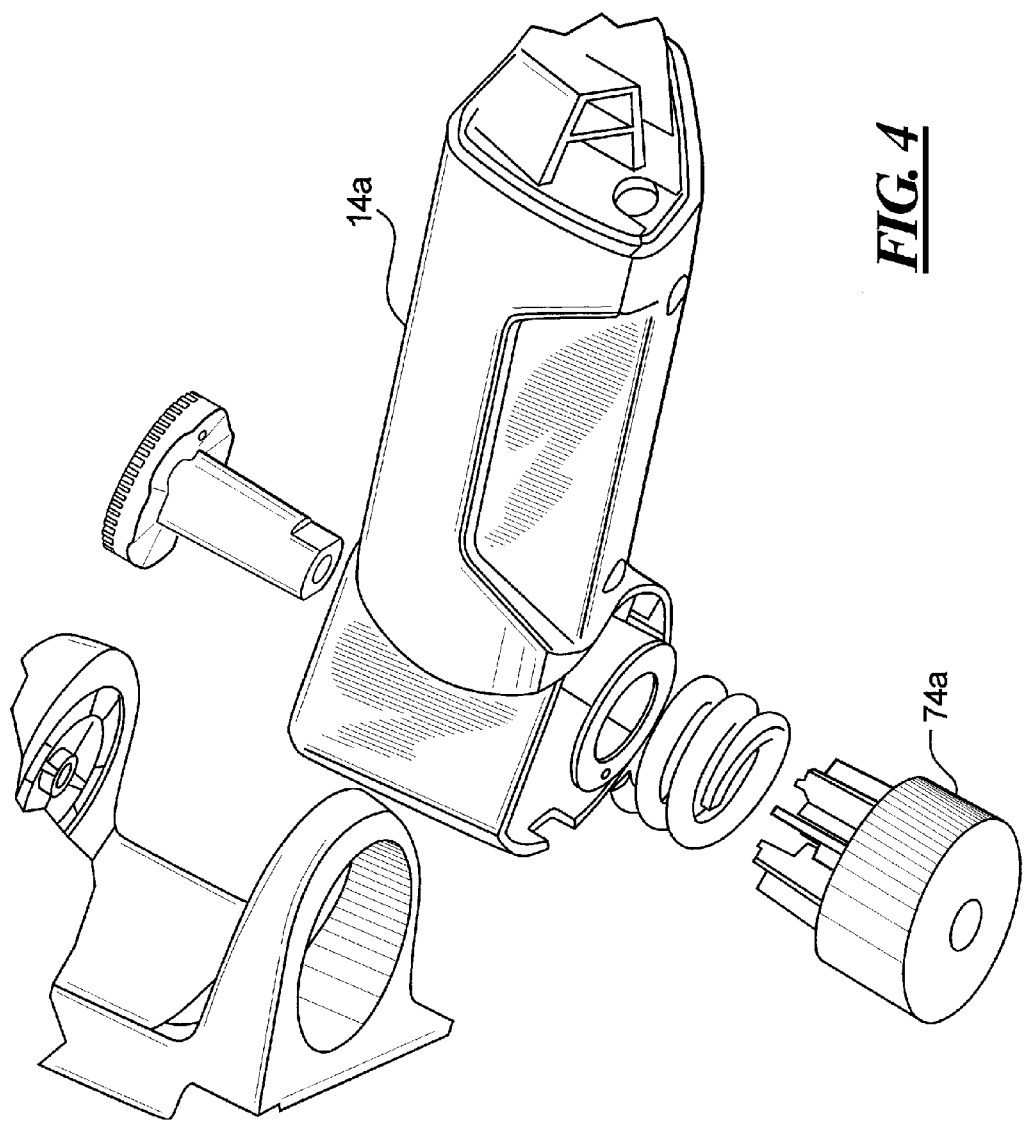
FIG. 4 is a perspective view of an alternative embodiment of the pivot portion of the mirror unit.
Figure 5:
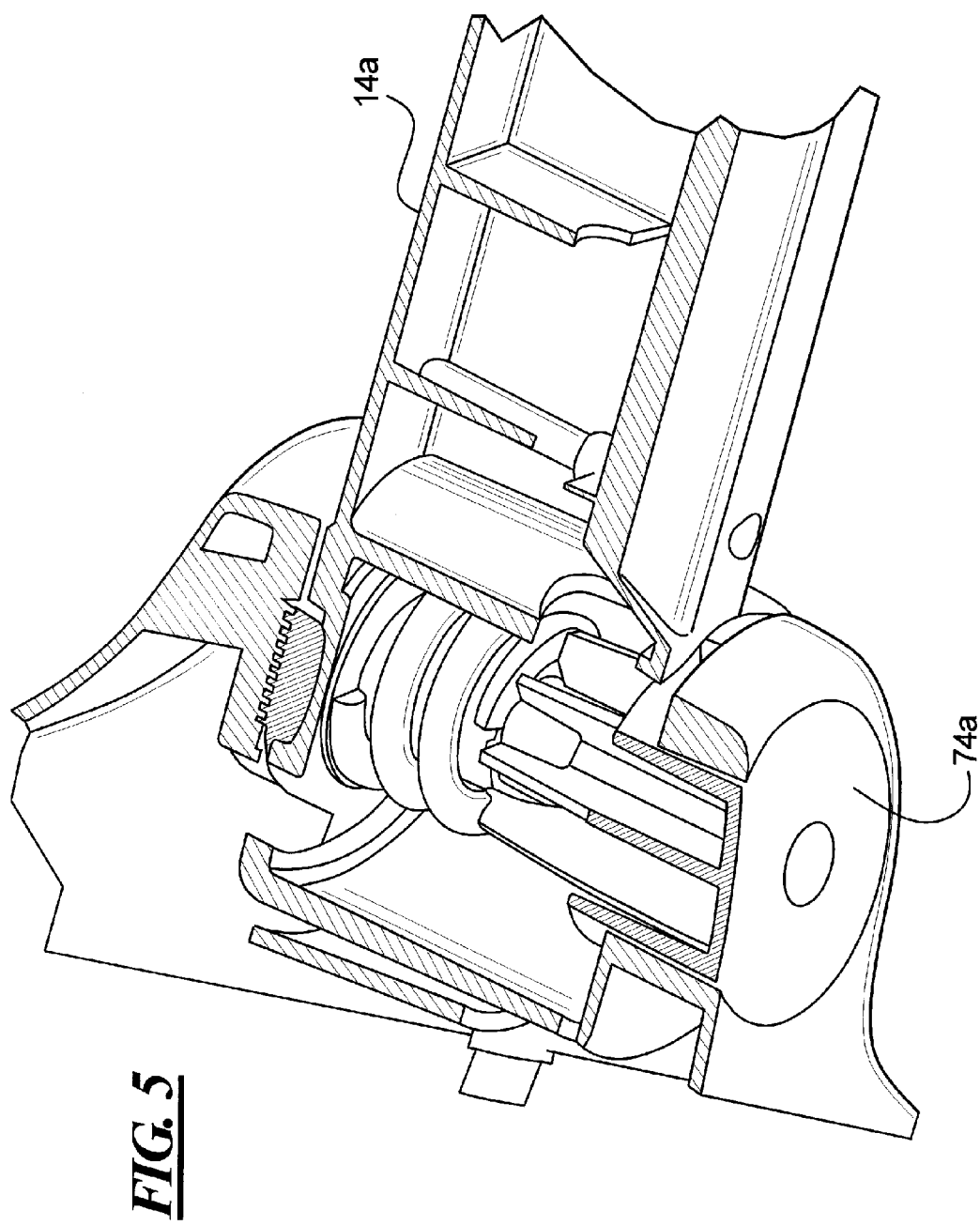
FIG. 5 is a cross section of the alternate embodiment of the pivot portion of the mirror unit of FIG. 4.

FIGS. 4 and 5 show an alternative embodiment of the mirror unit which embodies the same principles as in the previously described embodiment. The differences are primarily in the shaped of the arm 14*a* and the pivot support disc 74*a*. The person of ordinary skill will understand the structure and operation of this embodiment from the description of the previous described embodiment.

The present apparatus provides pivot stability. The stability of the pivot is improved by way of the pivot support disc 74 that fits snugly into the bottom bore in the ring portion 24 of the mounting base 12. A pivot system without this extra support can result in the potential of a downward movement of the arm 14 relative to indexing pivot post 50 under conditions of heavy vertical loading at the mirror head. This can happen, for example, when the vehicle is driving across a very rough road.

The pivot bolt 80 holds the entire assembly in a compressive state, minimizing the potential of releasing the energy of the compressed spring during some unusual catastrophic failure.

The present mirror unit 10 be assembled, disassembled or adjusted by way of a common Allen Wrench that can fit on the end of the pivot bolt 80. In one embodiment, the end of the bolt may have a cover that shields the bolt 80 from the elements).

In an alternative embodiment, the spring 72 presses the ramps together to define the detent or home position of the mirror, while another means causes the indexing surfaces to engage one another. For example, a threaded screw may be used to engage and release the indexing surfaces. The threaded screw may either be the bolt 80 or a further screw or bolt.

It is also foreseen that the spring may press the index member against the hub instead of pressing the hub against the index member.

Thus, there is shown and described a mirror unit for a vehicle that includes a base from which extends an arm holding a mirror housing. The arm is pivotably mounted in the base to permit the mirror to be pivoted toward the vehicle in the event that the mirror is struck, for example. The extended position of the mirror when not folded is defined by a detent in the pivoting movement. The detent position of the mirror is the result of a bolt that presses a spring. The spring in turn presses a hub on the arm against an indexing pivot post, so that ramps on the hub bear against ramps on the indexing pivot post and define the detent position of the mirror. The indexing pivot post has an arrangement of teeth that engage into tooth recesses on the base when pressed thereagainst by the spring. The detent position of the mirror can be changed by the user by the user releasing the bolt to relieve spring pressure on the teeth so that the teeth of the indexing pivot post disengage from the tooth recesses and can be pivoted to a new detent positions The new detent position is ensured by tightening the bolt so that the spring presses the teeth into the tooth recesses.

Although other modifications and changes may be suggested by those skilled in the art, it is the intention of the inventors to embody within the patent warranted hereon all changes and modifications as reasonably and properly come within the scope of their contribution to the art.

We claim:

1. A mirror unit for a vehicle, comprising:
   a base for connection to a vehicle, said base having a bracket portion defining a pivot space, said bracket portion including a first indexing surface;
   an arm having a pivot end in said pivot space of said base and a mirror at an opposite end, said pivot end defining a hollow interior; said pivot end including a hub with a first ramp surface;
   an indexing pivot member having a second indexing surface in cooperating contact with said first indexing surface of said bracket portion to define an index position of said arm with respect to said base, said indexing pivot member having a second ramp surface in cooperating contact with said first ramp surface of said arm to define a detent position of said arm with respect to said base;
   a spring mounted to press said first and second ramp surfaces into engagement with one another, said spring permitting said first and second ramp surfaces to rotate relative to one another from the detent position, said first and second indexing surfaces remaining in cooperating contact with one another in a set index position as said first and second ramp surfaces rotate relative to one another; and
   a release apparatus mounted on said base and operable to move said first and second indexing surfaces out of engagement when in a release position and to move said first and second indexing surfaces into engagement when in an engaged position.

2. A mirror unit as claimed in claim 1, wherein said release apparatus includes a threaded bolt in engagement with said base, said engagement surfaces being held in engagement by said threaded bolt when said threaded bolt is in a first position, said threaded bolt being operable to a second position to release said engagement surfaces from one another.

3. A mirror unit as claimed in claim 1, wherein said release apparatus includes a pivot support disc at one end of said spring, said threaded bolt extending through a central bore in said pivot support disc.

4. A mirror unit as claimed in claim 1, wherein said indexing surfaces include teeth and tooth recesses.

5. A mirror unit as claimed in claim 4, wherein said teeth are on said indexing pivot member and said tooth recesses are on said first indexing surface of said bracket portion.

6. A mirror unit as claimed in claim 4, wherein said teeth are arranged in a ring on said indexing pivot member.

7. A mirror unit as claimed in claim 4, wherein said teeth are arranged at regular intervals from one another.

8. A mirror unit for a vehicle, comprising:
   a base for connection to a vehicle, said base having a bracket portion defining a pivot space, said bracket portion including a first indexing surface;
   an arm having a pivot end in said pivot space of said base and a mirror at an opposite end, said pivot end defining a hollow interior; said pivot end including a hub with a first ramp surface;
   an indexing pivot member having a second indexing surface in cooperating contact with said first indexing surface of said bracket portion to define an index position of said arm with respect to said base, said indexing pivot member having a second ramp surface in cooperating contact with said first ramp surface of said arm to define a detent position of said arm with respect to said base;
   a spring mounted to press said first and second ramp surfaces into engagement with one another;
   a release apparatus mounted on said base and operable to move said first and second indexing surfaces out of engagement when in a release position and to move said first and second indexing surfaces into engagement when in an engaged position, said release apparatus including a pivot support disc at one end of said spring, said threaded bolt extending through a central bore in said pivot support disc said indexing pivot member including a post portion extending into engagement with said pivot support disc.

9. A mirror unit as claimed in claim 8, wherein said post portion includes at least one flat on said post portion fit into engagement with an opening having a corresponding flat in said pivot support disc.

10. A mirror unit for a vehicle, comprising:
    a base for connection to a vehicle, said base having a bracket portion defining a pivot space, said bracket portion including a first indexing surface;
    an arm having a pivot end in said pivot space of said base and a mirror at an opposite end, said pivot end defining a hollow interior; said pivot end including a hub with a first ramp
    an indexing pivot member having a second indexing surface in cooperating contact with said first indexing surface of said bracket portion to define an index position of said arm with respect to said base, said indexing pivot member having a second ramp surface in cooperating contact with said first ramp surface of said arm to define a detent position of said arm with respect to said base;
    a spring mounted to press said first and second ramp surfaces into engagement with one another; and
    a release apparatus mounted on said base and operable to move said first and second indexing surfaces out of engagement when in a release position and to move said first and second indexing surfaces into engagement when in an engaged position:
    said indexing pivot member including a disc shaped portion having said second indexing surface on one surface of said disc shaped portion and having said second ramp surface on an opposite surface of said disc shaped portion.

11. A mirror unit for a vehicle, comprising:
    a base for connection to a vehicle, said base having a bracket portion defining a pivot space, said bracket portion including a first indexing surface;
    an arm having a pivot end in said pivot space of said base and a mirror at an opposite end, said pivot end defining a hollow interior; said pivot end including a hub with a first ramp surface;
    an indexing pivot member having a second indexing surface in cooperating contact with said first indexing surface of said bracket portion to define an index position of said arm with respect to said base, said indexing pivot member having a second ramp surface in cooperating contact with said first ramp surface of said arm to define a detent position of said arm with respect to said base;
    a spring mounted to press said first and second ramp surfaces into engagement with one another;
    a release apparatus mounted on said base and operable to move said first and second indexing surfaces out of engagement when in a release position and to move said first and second indexing surfaces into engagement when in an engaged position: and a slip disc disposed between said spring and said hub.

* * * * *